United States Patent
Rohani

(10) Patent No.: US 11,972,418 B2
(45) Date of Patent: *Apr. 30, 2024

(54) MOBILE DEVICE, SYSTEM AND METHOD FOR CURRENCY EXCHANGE

(71) Applicant: EUROCAN ROYAL, Toronto (CA)

(72) Inventor: Mehdi M. Rohani, Toronto (CA)

(73) Assignee: Eurocan Royal, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,190

(22) Filed: May 11, 2023

(65) Prior Publication Data

US 2023/0281610 A1     Sep. 7, 2023

Related U.S. Application Data

(63) Continuation of application No. 17/378,645, filed on Jul. 16, 2021, now Pat. No. 11,687,917.
(Continued)

(51) Int. Cl.
*G06Q 20/38* (2012.01)
*G06Q 20/10* (2012.01)
(Continued)

(52) U.S. Cl.
CPC ......... *G06Q 20/381* (2013.01); *G06Q 20/108* (2013.01); *G06Q 20/227* (2013.01);
(Continued)

(58) Field of Classification Search
None
See application file for complete search history.

(56) References Cited

U.S. PATENT DOCUMENTS 8,459,560 B1 * 6/2013 Mineo-Goggin ............................ G06Q 20/3223
235/487
11,494,764 B2 * 11/2022 Madisetti ............. G06Q 20/381
(Continued)

OTHER PUBLICATIONS

"Harriet Meyer, The smartphone app revolutionising foreign currency exchange, the disruptors, May 12, 2016" (Year: 2016).*

*Primary Examiner* — Kito R Robinson
*Assistant Examiner* — Toan Duc Bui
(74) *Attorney, Agent, or Firm* — Dickinson Wright LLP; Matthew D. Powell

(57) ABSTRACT

A mobile device configured for currency exchange enables a user to cause funds in a first pre-established account and denominated in a first currency to be sent to a first transaction machine to purchase funds denominated in a second currency. The mobile device electronically receives second account information after a second account is created, with the second account being created responsive to completion of the first transaction. The created second account includes the purchased funds denominated in the second currency. Accordingly, the user is enabled, subsequent to the first transaction, to select a second account module in the mobile device that has since been configured with the received second account information of the created second account. The user can thereafter cause the mobile device to send that second account information to a second, different transaction machine to perform at least a second transaction in the second currency. Other aspects are disclosed.

17 Claims, 6 Drawing Sheets

Related U.S. Application Data

(60) Provisional application No. 63/052,849, filed on Jul. 16, 2020.

(51) Int. Cl.
*G06Q 20/22* (2012.01)
*G06Q 20/32* (2012.01)
*G06F 3/0482* (2013.01)

(52) U.S. Cl.
CPC ..... *G06Q 20/3223* (2013.01); *G06Q 20/3224* (2013.01); *G06Q 20/3274* (2013.01); *G06Q 20/3278* (2013.01); *G06F 3/0482* (2013.01)

(56) References Cited

U.S. PATENT DOCUMENTS

| | | | | |
|---|---|---|---|---|
| 2011/0282780 A1* | 11/2011 | French | ................... | G06Q 40/00 705/35 |
| 2013/0018738 A1* | 1/2013 | Faires | ................... | G06Q 20/381 705/16 |
| 2013/0085927 A1* | 4/2013 | Scott | ................... | G06Q 20/3224 705/39 |
| 2016/0092871 A1* | 3/2016 | Gordon | .............. | G06Q 20/3221 705/44 |
| 2017/0053249 A1* | 2/2017 | Tunnell | .................... | G09C 5/00 |
| 2019/0318326 A1* | 10/2019 | Russell | .............. | G06Q 20/3276 |
| 2022/0263886 A1* | 8/2022 | Rose | ................... | G06Q 20/206 |

\* cited by examiner

MOBILE DEVICE, SYSTEM AND METHOD FOR CURRENCY EXCHANGE

CROSS-REFERENCE

This application is a continuation of U.S. patent application Ser. No. 17/378,645 filed on Jul. 16, 2021 entitled "MOBILE DEVICE, SYSTEM AND METHOD FOR CURRENCY EXCHANGE", which claims the benefit of and priority to U.S. Provisional Patent Application Ser. No. 63/052,849 filed on Jul. 16, 2020 entitled "SYSTEM AND METHOD FOR FOREIGN EXCHANGE MOBILE APPLICATION", the contents of each of which are incorporated herein by reference in their entirety.

TECHNICAL FIELD

The following relates generally to mobile electronic devices, and more particularly to a mobile device, system and method for currency exchange.

BACKGROUND

Currency exchange has historically been done through the exchange of physical currencies. Improvements are desirable.

SUMMARY

An aspect of the disclosed embodiments is a mobile device including a first account module configured to store first account information associated with a first pre-established account, wherein the first pre-established account comprises funds denominated in a first currency; and a computing device processor operatively connected to the first account module and configured to: send the first account information from the mobile device to a first transaction machine to perform a first transaction, wherein the first transaction is conducted in the first currency to purchase funds denominated in a second currency, wherein the second currency is different from the first currency; receive second account information, the second account information associated with a second account, wherein the second account comprises the funds denominated in the second currency; responsive to receipt of the second account information, configure a second account module of the mobile device to store the second account information; and send the second account information from the mobile device to a second transaction machine to perform a second transaction using the funds denominated in the second currency.

Another aspect of the disclosed embodiments is a currency exchange method comprising: storing, in a mobile device, first account information associated with a first pre-established account, wherein the first pre-established account comprises funds denominated in a first currency; sending the first account information from the mobile device to a first transaction machine to perform a first transaction, wherein the first transaction is conducted in the first currency to purchase funds denominated in a second currency, wherein the second currency is different from the first currency; receiving second account information, the second account information associated with a second account, wherein the second account comprises the funds denominated in the second currency; and responsive to receipt of the second account information, configure a second account module of the mobile device to store the second account information for use in a second transaction.

Another aspect of the disclosed embodiments is a non-transitory processor-readable medium embodying a computer program for currency exchange, the computer program comprising: computer program code for storing, in a mobile device, first account information associated with a first pre-established account, wherein the first pre-established account comprises funds denominated in a first currency; computer program code for sending the first account information from the mobile device to a first transaction machine to perform a first transaction, wherein the first transaction is conducted in the first currency to purchase funds denominated in a second currency, wherein the second currency is different from the first currency; computer program code for receiving second account information, the second account information associated with a second account, wherein the second account comprises the funds denominated in the second currency; and computer program code for responsive to receipt of the second account information, configure a second account module of the mobile device to store the second account information for use in a second transaction.

These and other aspects of the present disclosure are provided in the following detailed description of the embodiments, the appended claims, and the accompanying figures.

Other aspects and embodiments will become apparent upon reading the following description.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
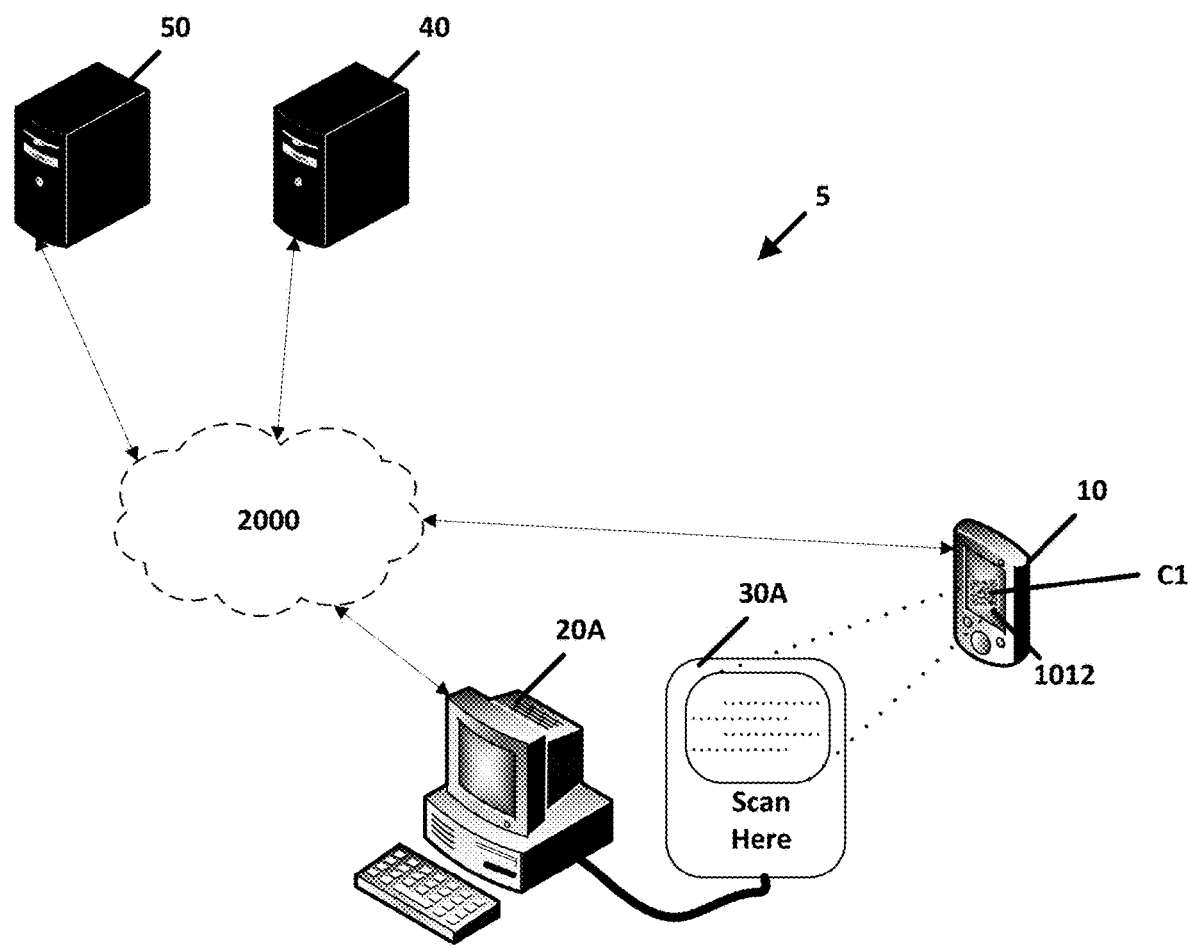
FIG. 1 is a diagram of a system for conducting a first transaction using a mobile device.

FIG. 1 is a diagram of a system 5 for conducting a first transaction using a mobile device 10. System 5 includes a mobile device 10, a first transaction machine 20A, a currency exchange provider server 40, and a payment provider server 50. Mobile device 10 is in network communications via a network 2000 with one or both of currency exchange provider server 40 and payment provider server 50. Mobile device 10 is operable to include a first account module that is configured to store first account information associated with a first pre-established account that is accessed via payment provider server 50. The first account module may be a component of a mobile wallet application on mobile device 10. The first pre-established account may be of a particular type, such as a credit account, a debit account, a mobile payment account, a pre-paid gift card account, a loyalty awards account, a cryptocurrency account, or some other stored value account. Mobile device 10 includes a computing device processor 1018 (not shown in FIG. 1). Under the control of processor 1018, the first account information can be sent from mobile device 10 to the first transaction machine 20A to perform a first transaction. In some embodiments, mobile device 10 has a display device 1012 that is operatively connected to processor 1018. In some embodiments, processor 1018 is configured to display a first machine-readable code C1 corresponding to the first account information for scanning by a first scanner 30A of the first transaction machine 20A. In some embodiments, first transaction machine 20A and first scanner 30A are owned and operated by a currency exchange provider. In some embodiments, machine-readable code C1 is a barcode, a QR code, or some other displayable machine-readable code.

In some embodiments, the first transaction is conducted in a first currency, such as in Canadian dollars (CAD), to purchase funds denominated in a second, different, currency, such as United States dollars (USD). Exchanges between other currencies, such as between a cryptocurrency such as Bitcoin, and a national currency such as British Pounds Sterling, may be conducted using system 5. Other exchanges of denominations are possible.

Processor 1018 of mobile device 10 is also configured to receive second account information that is associated with a second account, with the second account including the funds denominated in the second currency that had been purchased during the first transaction using the first currency. Processor 1018 is also configured to, responsive the receipt of the second account information, configure a second account module of mobile device 10 to store the second account information. Processor 1018 is also configured to, when a second transaction is to be conducted, send the second account information from mobile device 10 to a second transaction machine, such as transaction machine 20B (see FIG. 2), to perform a second transaction using the funds denominated in the second currency.

In some embodiments, the second account is created in respect of the user of mobile device 10 by currency exchange provider server 40 upon confirmation with payment provider server 50 that the first transaction has been completed. Variations are possible. In some embodiments, pursuant to the creation of the second account, and the provision by currency exchange provider server 40 via network 2000 to mobile device 10 of the second account information, the second account information may be transmitted via network 2000 to mobile device 10. In some embodiments, where there is two-way communications between scanning device 30A and mobile device 10, the second account information may be sent to mobile device 10 via first transaction machine 20A and first scanner 30A.

The mobile device 10 receiving the second account information enables electronic access, via mobile device 10, to the funds denominated in the second currency that had been purchased with the first currency using mobile device 10. In this way, a user does not have to worry about receiving and handling physical currency from a chosen currency exchange provider, and yet the funds can be deployed from the mobile device 10 itself, as will be described herein.

Figure 2:
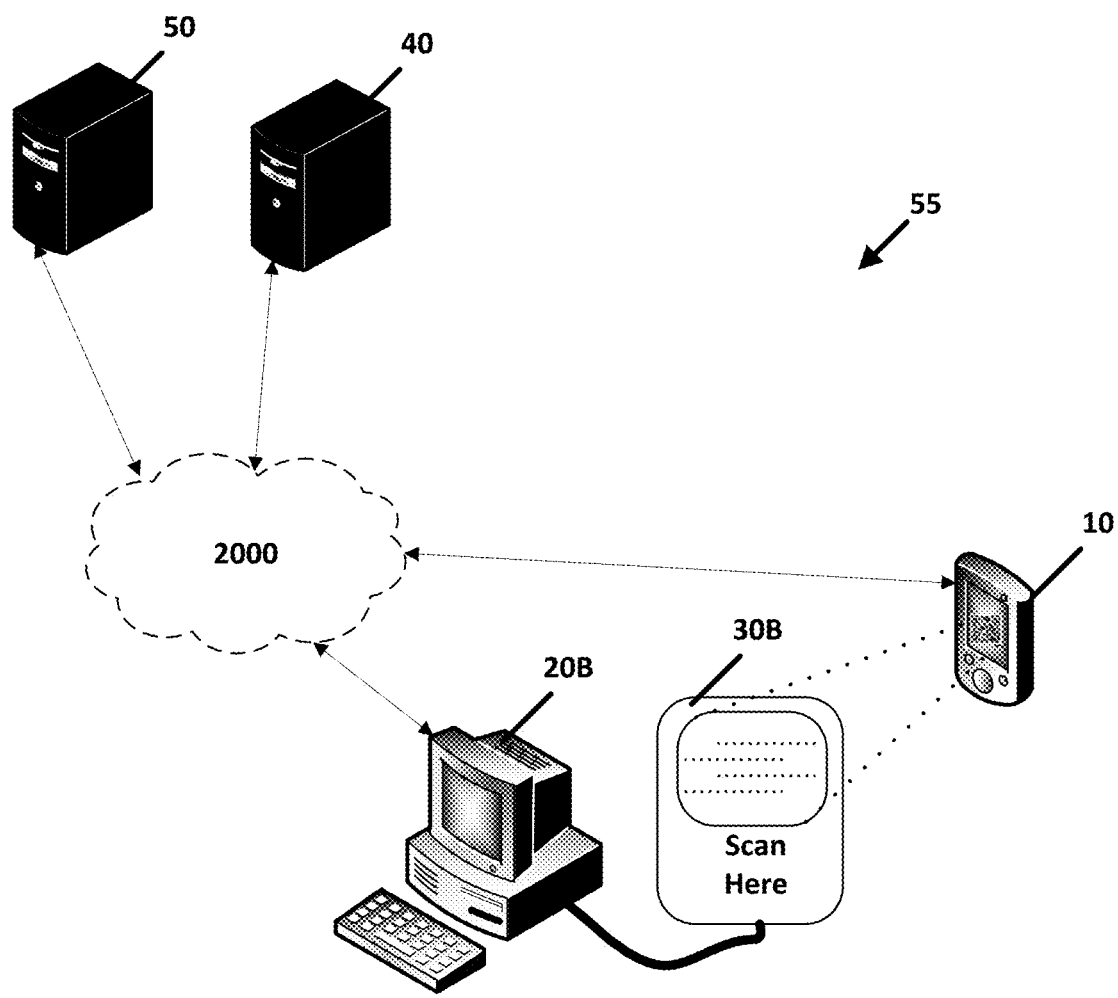
FIG. 2 is a diagram of a system for conducting a second transaction using the mobile device.

FIG. 2 is a diagram of a system 55 for conducting a second transaction with mobile device 10. System 55 is similar to system 5, and includes mobile device 10, a second transaction machine 20B, the currency exchange provider server 40, and the payment provider server 50. Mobile device 10 is in network communications via a network 2000 with one or both of currency exchange provider server 40 and payment provider server 50. With the first transaction having been conducted thereby to enable mobile device 10 to configure the second account module of the mobile device 10 to store the second account information, the second account information can be sent from mobile device 10 to second transaction machine 20B via a respective scanner 30B thereby to perform a second transaction using the funds denominated in the second currency. The second account module may also be a component of the mobile wallet application on mobile device 10. The second account may be of a particular type, such as a credit account, a debit account, a mobile payment account, a pre-paid gift card account, a loyalty awards account, a cryptocurrency account, or some other stored value account. However, where the first transaction is a currency exchange it will generally be the case that the second account is a debit account or will otherwise operate similarly to a pre-paid gift card account. Under the control of processor 1018, the second account information can be sent from mobile device 10 to the second transaction machine 20B to perform the second transaction. For example, processor 1018 may be configured to display a second machine-readable code C2 corresponding to the second account information for scanning by a second scanner 30B of the second transaction machine 20B. In some embodiments, second transaction machine 20B and second scanner 30B are owned and operated by a retail merchant, such as a gift shop, a restaurant, an amusement park, a hotel, another or the same currency exchange provider, or some other merchant or service. In some embodiments, machine-readable code C2 is a barcode, a QR code, or some other displayable machine-readable code.

In some embodiments, where mobile device 10 includes an NFC (Near Field Communications) device, processor 1018 of mobile device 10 may send the first account information and/or the second account information to first transaction machine 20A or second transaction machine 20B similar equipped, via NFC. Other methods of sending first account information and second account information are possible. In some embodiments, where mobile device 10 and the transaction machines are so equipped, first account information may be sent by mobile device 10 for the first transaction via NFC while second account information may be second by mobile device 10 for the second transaction by displaying and scanning a machine-readable code. In some embodiments, first account information may be sent by mobile device 10 for the first transaction by displaying and scanning a machine-readable code while second account information may be second by mobile device 10 for the second transaction via NFC.

In some embodiments, mobile device 10 includes a positioning system, such as a global positioning system (GPS), that determines a physical location of mobile device 10. Processor 1018 may display, via user interface 1012, a plurality of currency-exchange service options that are selected for display based at least on the physical location of mobile device 10. For example, when disembarking from an airplane at a vacation destination, a user may be presented with currency-exchange service options local to the destination. Information about the currency-exchange service options may include exact locations, rates, incentives, and the like. Such currency-exchange service options may pay to be displayed on mobile device 10 as one of the options selectable by a user.

Figure 3:
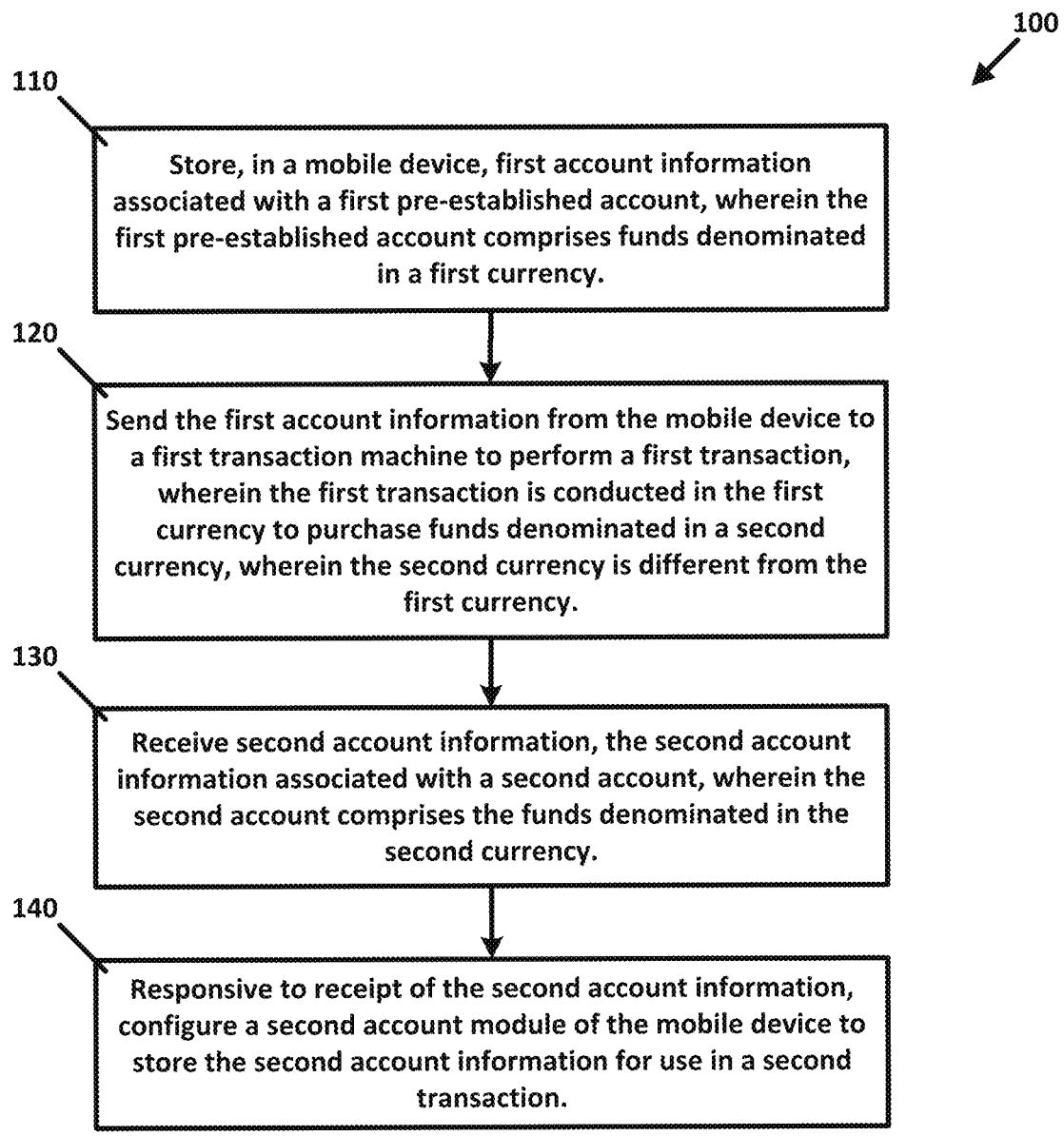
FIG. 3 is a flow diagram generally illustrating steps in a currency exchange method.

FIG. 3 is a flow diagram generally illustrating steps in a currency exchange method 100. At 110, the method 100 stores, in a mobile device, first account information associated with a first pre-established account, wherein the first pre-established account comprises funds denominated in a first currency. At 120, the method 100 sends the first account information from the mobile device to a first transaction machine to perform a first transaction, wherein the first transaction is conducted in the first currency to purchase funds denominated in a second currency, wherein the second currency is different from the first currency. At 130, the method 100 receives second account information, the second account information associated with a second account, wherein the second account comprises the funds denominated in the second currency. At 140, the method 100, responsive to receipt of the second account information, configures a second account module of the mobile device to store the second account information for use in a second transaction.

In some embodiments, the second account information is sent from the mobile device to a second transaction machine to perform the second transaction using the funds denominated in the second currency. In some embodiments, a first machine-readable code corresponding to the first account information for scanning by the first transaction machine is displayed. In some embodiments, a second machine-readable code corresponding to the second account information for scanning by the second transaction machine is displayed. In some embodiments, the first account information to the first transaction machine is sent via an NFC device associated with the mobile device. In some embodiments, the second account information is sent to the second transaction machine via the NFC device. In some embodiments, the mobile device presents a user interface. In some embodiments, a first indication that the user wants to use the first account to engage in the first transaction is received via the user interface, and the first account information is caused to be sent to the first transaction machine responsive to the first indication. In some embodiments, a second indication that the user wants to use the second account to engage in the second transaction is received via the user interface, and the second account information is caused to be sent to the second transaction machine responsive to the second indication.

In some embodiments, a physical location of the mobile device is automatically determined, and a plurality of currency-exchange service options, wherein the plurality of currency-exchange service options is selected for display based at least on the physical location of the mobile device, is displayed via the user interface.

Figure 4:
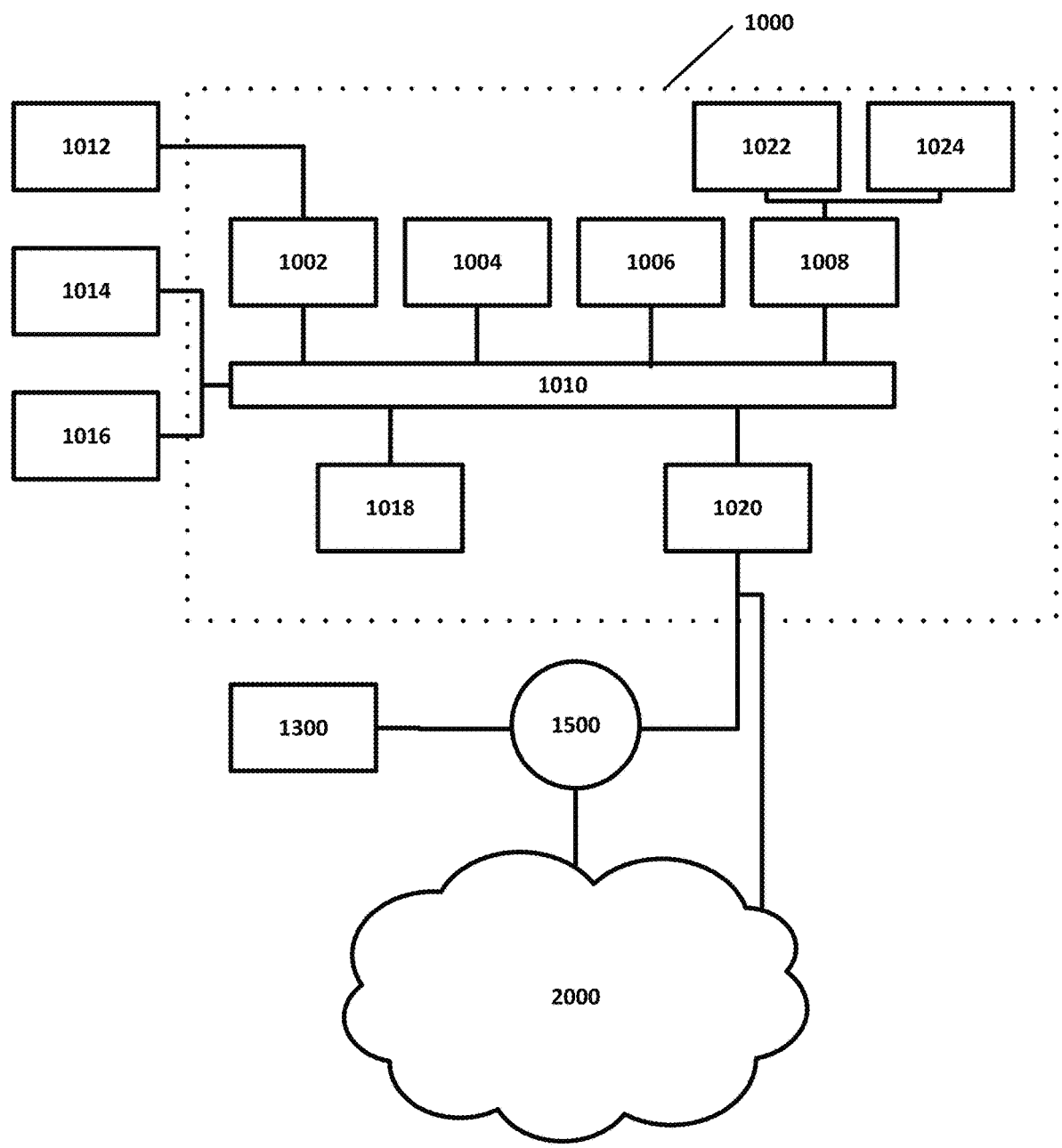
FIG. 4. is a schematic diagram showing a hardware architecture of a computing system configurable to implement aspects of the currency exchange method.

FIG. 4 is a schematic diagram showing a hardware architecture of a computing system 1000 configurable to implement aspects of the currency exchange method, in some embodiments. Computing system 1000 is suitable as the hardware platform for a computing device such as a mobile device configured to implement aspects of the currency exchange method, in some embodiments. In some embodiments, such a computing device may be a server with which a user on a remote computing device, such as a mobile device, interacts via application software to carry out steps described herein.

Computing system 1000 includes a bus 1010 or other communication mechanism for communicating information, and a computing device processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

Computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

Computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computing system 1000 also includes a display controller 1002 coupled to the bus 1010 to control a display device (or, "display") 1012, such as an LED (light emitting diode) screen, organic LED (OLED) screen, liquid crystal display (LCD) screen or some other device suitable for displaying information to a computer user. In embodiments, display controller 1002 incorporates a dedicated graphics-processing unit (GPU) for processing mainly graphics-intensive or other parallel operations. Such operations may include rendering by applying texturing, shading and the like to wire-frame objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application-programming interface (API) such as OpenGL, Direct3D and the like.

Computing system 1000 may include input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, radar/sonar and the like. A printer may provide printed listings of data stored and/or generated by the computing system 1000.

Computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry, such as an Application Specific Integrated Circuit (ASIC), may be used in place of or in combination with software instructions.

As stated above, computing system 1000 includes at least one processor readable medium or memory for holding instructions programmed according to the teachings of the description and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, is software for controlling the computing system 1000, for driving a device or devices to perform the functions discussed herein, and for enabling computing system 1000 to interact with a human user. Such software may include, but is not limited to, device drivers, operating systems, development tools, and applications software. Such processor readable media further includes the computer program product for performing all or a portion (if processing is distributed) of the processing performed discussed herein.

The computer code devices discussed herein may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

Computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different from baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of computing system may be used to implement the systems and processes described herein.

Electronic data stores implemented in the database described herein may be one or more of a table, an array, a database, a structured data file, an XML file, or some other functional data store, such as hard disk 1022 or removable media 1024.

Figure 5A:
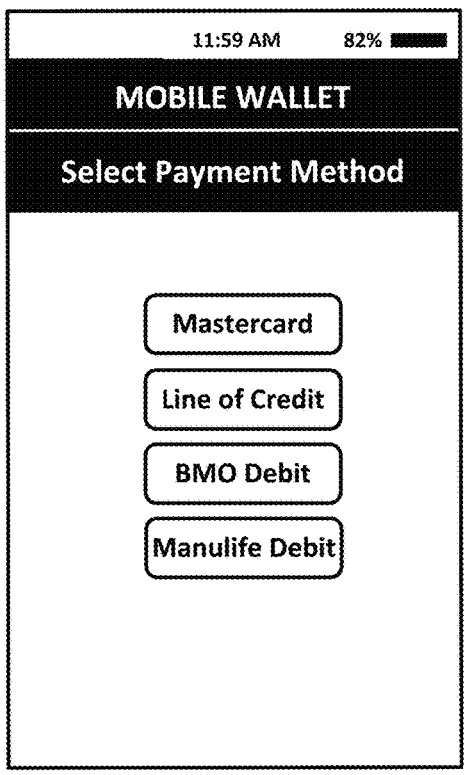
FIGS. 5A through 5D are a series of user interfaces made available by a mobile wallet application running on a mobile device.

FIGS. 5A through 5D are a series of user interfaces made available by a mobile wallet application running on a mobile device, according to an embodiment. In FIG. 5A, the mobile wallet application presents a number of payment methods corresponding to respective pre-established accounts. In this example, options for a Mastercard credit payment method, a Line of Credit payment method, a BMO (Bank of Montreal) Debit payment method, and a Manulife Debit payment method are presented and available for selection from a user.

Figure 5B:
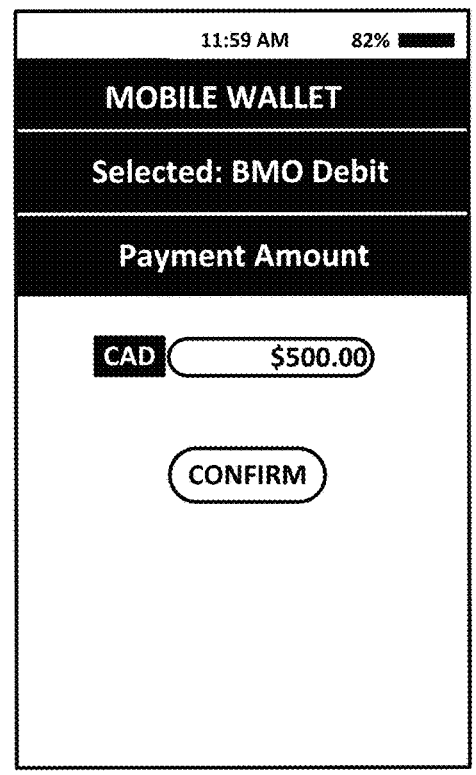
Figure 5C:
Figure 5D:
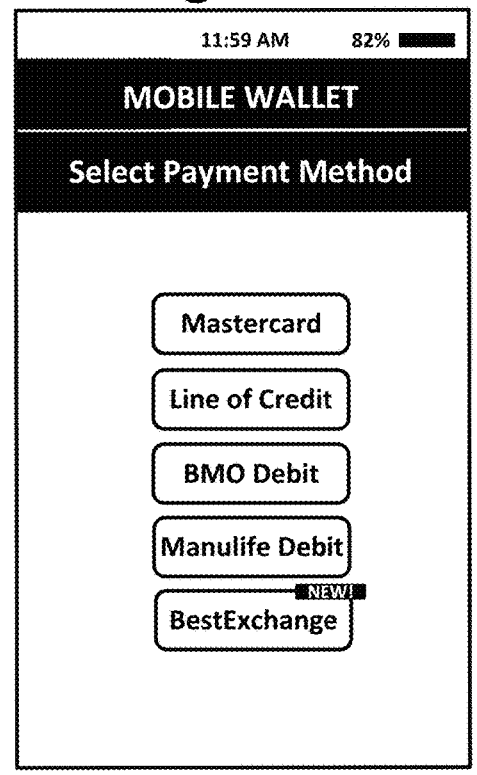

Upon selection by a user of one of the payment method options in the mobile wallet application, a user thereby provides a first indication that the user wants to use a first account to engage in a first transaction. In FIG. 5B, the user has selected the BMO Debit payment method, thereby to indicate the user wishes to use his/her BMO debit account. The user may is presented with the currency denomination—in this example Canadian dollars (CAD)—and is provided with an editable box in which to type in an amount of the currency to use for the first transaction. Upon pressing a CONFIRM button, the user is directed to the user interface shown in FIG. 5C. At this time, machine-readable code C1—in this example a "QR Code"—is displayed in the user interface, along with an instruction for the user to "Scan Payment Code". The user may present the displayed machine-readable code C1 to scanner 30A of first transaction machine 20A in order to send first account information (corresponding to the pre-established BMO debit account) to first transaction machine 20A. In this example, because first transaction machine 20A is owned and operated by a currency exchange provider, as described herein the second account information is received by mobile device 10 that corresponds to a second account created in response to the first transaction, wherein the second account includes the funds denominated in the second currency that had been purchased during the first transaction. In this embodiment, as will be described, the second currency is United States dollars (USD). In FIG. 5D, information about a second account module configured to store the second account information is shown on the user interface. In particular, an additional payment option is now displayed as "BestExchange". In this embodiment, a small "NEW" marker is presented to show the user that the new payment method, corresponding to the second currency denomination, is now available via the mobile wallet application.

Figure 6A:
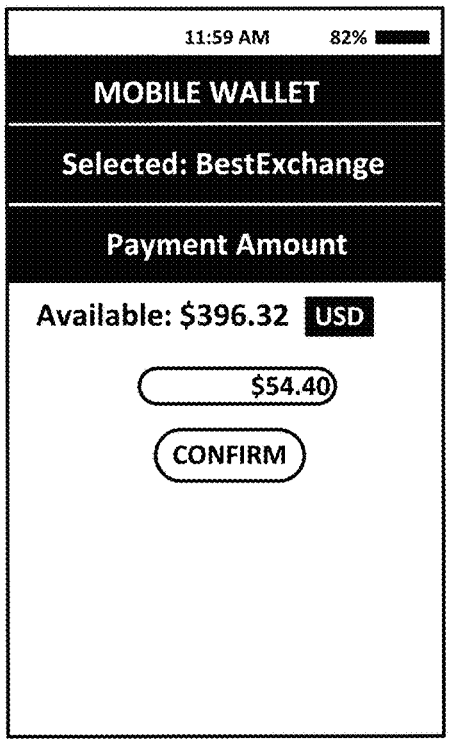
FIGS. 6A through 6D are a series of user interfaces made available by a mobile wallet application running on a mobile device.
Figure 6B:
Figure 6C:
Figure 6D:
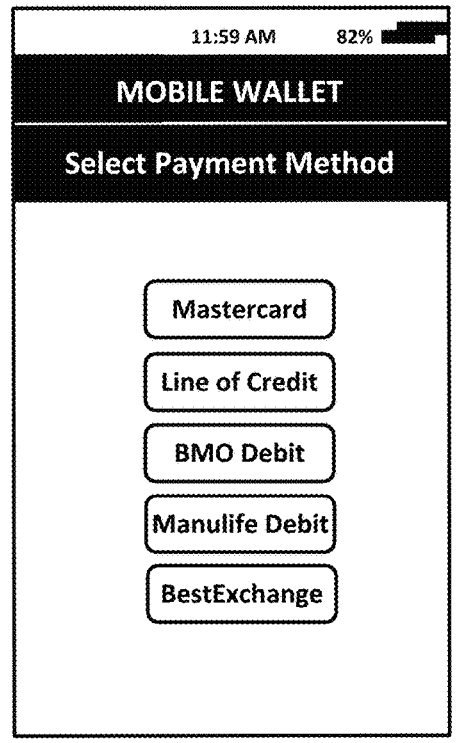

FIGS. 6A through 6D are a series of user interfaces made available by a mobile wallet application running on mobile device 10. In FIG. 6A, a user has selected "BestExchange" from the user interface displayed in FIG. 5D. A user may do this when the user wishes to use the currency denomination of the second account to purchase something from a merchant, such as a gift shop, a hotel, a restaurant, or the like as described herein. The user is shown how much value is available in the second account, and the currency denomination of the second account (in this example, USD), and is provided with an editable box in which to type in an amount of the currency of the second account to use for a second transaction. Upon pressing a CONFIRM button, the user is directed to the user interface shown in FIG. 6B. At this time, machine-readable code C2—in this example a "QR Code"—is displayed in the user interface, along with an instruction for the user to "Scan Payment Code". The user may present the displayed machine-readable code C2 to scanner 30B of second transaction machine 20B in order to send second account information (corresponding to the new BestExchange debit account) to second transaction machine 20B. Upon pressing "DONE" a user interface may be displayed as in FIG. 6C, which shows the funds available in second account, and the currency denomination. Upon pressing "DONE" again, the user may be led back to the payment method options screen.

Although embodiments have been described, those of skill in the art will appreciate that variations and modifications may be made without departing from the spirit, scope and purpose of the invention as defined by the appended claims.

What is claimed is:

1. A mobile device comprising:
a first account module configured to store first account information associated with a first pre-established account, wherein the first pre-established account comprises funds denominated in a first currency;
a user interface;
and
at least one computing device processor operatively connected to the first account module and the user interface and configured to:
enable a user of the mobile device to select the first account module via the user interface for user for at least a first transaction;
send the first account information from the mobile device to a first transaction machine to perform the first transaction, wherein the first transaction is conducted in the first currency to purchase funds denominated in a second currency, wherein the second currency is different from the first currency;
receive second account information, the second account information associated with a second account, the second account information being electronically received by the mobile device after the second account is created, the second account being created responsive to the first transaction machine confirming completion of the first transaction, wherein the created second account comprises the funds denominated in the second currency purchased during the first transaction;
responsive to receipt of the second account information, configure a second account module of the mobile device to store the second account information;
enabling a user of the mobile device, subsequent to the first transaction, to select the second account module via the user interface for use for at least a second transaction; and
enabling the user of the mobile device to send the second account information from the mobile device to a second transaction machine to perform the second transaction using the funds denominated in the second currency, wherein the second transaction machine is different from the first transaction machine,
wherein the user interface further comprises:
a display device operatively connected to the computing device processor, wherein the at least one computing device processor is configured to display a first machine-readable code corresponding to the first account information for scanning by the first transaction machine, wherein the at least one computing device processor is configured to display a second machine-readable code corresponding to the second account information for scanning by the second transaction machine.

2. The mobile device of claim 1, further comprising:
a near field communication (NFC) device operatively connected to the at least one computing device processor, wherein the at least one computing device processor is configured to send the first account information to the first transaction machine via the NFC device.

3. The mobile device of claim 2, wherein the at least one computing device processor is configured to send the second account information to the second transaction machine via the NFC device.

4. The mobile device of claim 1, wherein the mobile device further comprises:
a positioning system configured to determine a physical location of the mobile device, wherein the at least one computing device processor is further configured to:
display, via a display device of the user interface, a plurality of currency-exchange service options, wherein the plurality of currency-exchange service options is selected for display based at least on the physical location of the mobile device.

5. The mobile device of claim 1, wherein the first pre-established account is of a type selected from the group consisting of: a credit account, a debit account, a mobile payment account, a pre-paid gift card account, a loyalty awards account, and a cryptocurrency account.

6. A currency exchange method comprising:
storing, in a mobile device, first account information associated with a first pre-established account, wherein the first pre-established account comprises funds denominated in a first currency;
enabling a user of the mobile device to select the first account information for use for at least a first transaction;
sending the first account information from the mobile device to a first transaction machine to perform the first transaction, wherein the first transaction is conducted in the first currency to purchase funds denominated in a second currency, wherein the second currency is different from the first currency;
receiving second account information, the second account information associated with a second account, the second account information being electronically received by the mobile device after the second account is created, the second account being created responsive to the first transaction machine confirming completion of the first transaction, wherein the created second account comprises the funds denominated in the second currency purchased during the first transaction;
responsive to receipt of the second account information, configuring a second account module of the mobile device to store the second account information for use for at least a second transaction;
enabling a user of the mobile device, subsequent to the first transaction, to select the second account information for use for at least the second transactions;
causing the mobile device to display a first machine-readable code corresponding to the first account information for scanning by the first transaction machine; and causing the mobile device to display a second machine-readable code corresponding to the second account information for scanning by the second transaction machine.

7. The method of claim 6, further comprising:
enabling the user of the mobile device to send the second account information from the mobile device to a second transaction machine to perform the second transaction using the funds denominated in the second currency, wherein the second transaction machine is different from the first transaction machine.

8. The method of claim 6, further comprising:
causing the mobile device to send the first account information to the first transaction machine via an NFC device associated with the mobile device.

9. The method of claim 8, further comprising:
causing the mobile device to send the second account information to the second transaction machine via the NFC device.

10. The method of claim 6, further comprising:
automatically determining a physical location of the mobile device; and
displaying, via a user interface of the mobile device, a plurality of currency-exchange service options, wherein the plurality of currency-exchange service options is selected for display based at least on the physical location of the mobile device.

11. The method of claim 6, wherein the first pre-established account is of a type selected from the group consisting of: a credit account, a debit account, a mobile payment account, a pre-paid gift card account, a loyalty awards account, and a cryptocurrency account.

12. A non-transitory processor-readable medium embodying a computer program for currency exchange, the computer program comprising:
computer program code for storing, in a mobile device, first account information associated with a first pre-established account, wherein the first pre-established account comprises funds denominated in a first currency;
computer program code for enabling a user of the mobile device to select the first account information for use for at least a first transaction;
computer program code for sending the first account information from the mobile device to a first transaction machine to perform the first transaction, wherein the first transaction is conducted in the first currency to purchase funds denominated in a second currency, wherein the second currency is different from the first currency;
computer program code for receiving second account information, the second account information associated with a second account, the second account information being electronically received by the mobile device after the second account is created, the second account being created responsive to the first transaction machine confirming completion of the first transaction, wherein the created second account comprises the funds denominated in the second currency purchased during the first transaction;
computer program code for responsive to receipt of the second account information, configure a second account module of the mobile device to store the second account information for use in at least a second transaction;

computer program code for enabling a user of the mobile device, subsequent to the first transaction, to select the second account information for use for at least the second transaction;

computer program code for causing the mobile device to display a first machine-readable code corresponding to the first account information for scanning by the first transaction machine; and computer program code for causing the mobile device to display a second machine-readable code corresponding to the second account information for scanning by the second transaction machine.

13. The non-transitory processor-readable medium of claim 12, further comprising:

computer program code for enabling the user of the mobile device to send the second account information from the mobile device to a second transaction machine to perform the second transaction using the funds denominated in the second currency, wherein the second transaction machine is different from the first transaction machine.

14. The non-transitory processor-readable medium of claim 12, further comprising:

computer program code for causing the mobile device to send the first account information to the first transaction machine via an NFC device associated with the mobile device.

15. The non-transitory processor-readable medium of claim 14, further comprising:

computer program code for sending the second account information to the second transaction machine via the NFC device.

16. The non-transitory processor-readable medium of claim 12, further comprising: computer program code for automatically determining a physical location of the mobile device; and computer program code for displaying, via a user interface of the mobile device, a plurality of currency-exchange service options, wherein the plurality of currency-exchange service options is selected for display based at least on the physical location of the mobile device.

17. The non-transitory processor-readable medium of claim 12, wherein the first pre-established account is of a type selected from the group consisting of: a credit account, a debit account, a mobile payment account, a pre-paid gift card account, a loyalty awards account, and a cryptocurrency account.

* * * * *